United States Patent
Choo et al.

(10) Patent No.: US 7,948,471 B2
(45) Date of Patent: May 24, 2011

(54) LIQUID CRYSTAL DEVICE DISPLAYING AND SENSING IMAGES AND METHOD OF DRIVING THE SAME

(75) Inventors: Kyo-Seop Choo, Suwon-si (KR);
Yeon-Sun Kim, Gangwon-do (KR);
Hee-Kwang Kang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1069 days.

(21) Appl. No.: 11/404,904

(22) Filed: Apr. 17, 2006

(65) Prior Publication Data

US 2007/0146282 A1 Jun. 28, 2007

(30) Foreign Application Priority Data

Dec. 28, 2005 (KR) .................. 10-2005-0131722

(51) Int. Cl.
G09G 3/36 (2006.01)
(52) U.S. Cl. ........................ 345/104; 345/87; 345/207
(58) Field of Classification Search ............ 345/87–104, 345/207

See application file for complete search history.

(56) References Cited

U.S. PATENT DOCUMENTS

| | | | | |
|---|---|---|---|---|
| 5,204,661 A * | 4/1993 | Hack et al. | ...................... | 345/88 |
| 5,412,595 A * | 5/1995 | Shannon | ...................... | 365/108 |
| 5,754,153 A * | 5/1998 | Mizutome et al. | .............. | 345/97 |
| 5,784,037 A * | 7/1998 | Inoue | .............................. | 345/87 |
| 5,838,308 A * | 11/1998 | Knapp et al. | .................. | 345/173 |
| 5,920,401 A * | 7/1999 | Street et al. | .................... | 358/400 |
| 2003/0052850 A1* | 3/2003 | Zhang et al. | .................... | 345/87 |
| 2006/0158410 A1* | 7/2006 | Fujine | .............................. | 345/89 |
| 2007/0091218 A1* | 4/2007 | Huang et al. | ..................... | 349/40 |
| 2007/0171163 A1* | 7/2007 | Miyata | ............................ | 345/87 |

* cited by examiner

*Primary Examiner* — Kimnhung Nguyen
(74) *Attorney, Agent, or Firm* — Birch, Stewart, Kolasch & Birch, LLP

(57) ABSTRACT

A liquid crystal device and method for displaying and sensing images are provided. According to one embodiment, the liquid crystal device includes a sensing part to sense an image in a scan mode of the liquid crystal device, the sensing part including at least one charging element which is charged at a start of the scan mode with a reset voltage, so as to reset the at least one charging element for the scan mode; and a display part to display an image corresponding to a data signal according to a scan signal in a display mode of the liquid crystal device.

29 Claims, 4 Drawing Sheets

LIQUID CRYSTAL DEVICE DISPLAYING AND SENSING IMAGES AND METHOD OF DRIVING THE SAME

This application claims the priority benefit of Korean Patent Application No. 10-2005-0131722, filed on Dec. 28, 2005 in Republic of Korea, which is hereby incorporated by reference for all purposes as if fully set forth herein.

BACKGROUND OF THE INVENTION

1. Field of the Invention

The invention pertains to a liquid crystal device, and more particularly, to a liquid crystal device for displaying and scanning images, and a method of driving the same.

2. Description of the Related Art

Among the various types of flat panel display (FPD) devices, liquid crystal display (LCD) devices are widely used as monitors for notebook computers and desktop computers because of their excellent characteristics such as light weight, portability and low power consumption. Specifically, active matrix type LCD devices having thin film transistors (TFTs) as switching elements have been researched and developed because of their superiority in displaying moving images.

FIG. 1 is a schematic block diagram of a liquid crystal display device according to the related art, and FIG. 2 is a schematic view showing a liquid crystal panel of the liquid crystal display device according to the related art. In FIGS. 1 and 2, the liquid crystal display device includes a liquid crystal panel 2 and a liquid crystal module (LCM) driving circuit 26. The LCM driving circuit 26 includes an interface 10, a timing controller 12, a source voltage generator 14, a reference voltage generator 16, a data driver 18 and a gate driver 20. RGB data and timing sync signals, such as clock signals, horizontal sync signals, vertical sync signals and data enable signals, are input from a driving system (not shown) such as a personal computer, to the interface 10. The interface 10 outputs the RGB data and the timing sync signals to the timing controller 12. For example, a low voltage differential signal (LVDS) interface and transistor logic (TTL) interface may be used for transmission of the RGB data and the timing sync signals. In addition, the interface 10 may be integrated in a single chip together with the timing controller 12.

A plurality of gate lines "GL1" to "GLn" and a plurality of data lines "DL1" to "DLm" are formed in the liquid crystal panel 2 and are driven respectively by the gate driver 20 and the data driver 18. The plurality of gate lines "GL1" to "GLn" and the plurality of data lines "DL1" to "DLm" cross each other to define a plurality of pixel regions "P." For each pixel region P, a thin film transistor "TFT" is connected to the corresponding gate line and the corresponding data line, and a liquid crystal capacitor "LC" connected to the thin film transistor "TFT" is formed in each pixel region "P." The liquid crystal capacitor "LC" is turned on/off by the thin film transistor "TFT," thereby modulating transmittance of incident light and displaying images.

The timing controller 12 generates data control signals for the data driver 18 including a plurality of data integrated circuits (ICs), and gate control signals for the gate driver 20 including a plurality of gate ICs. Moreover, the timing controller 12 outputs data signals to the data driver 18. The reference voltage generator 16 generates reference voltages of a digital-to-analog converter (DAC) used in the data driver 18. The reference voltages are set up according to transmittance-voltage characteristics of the liquid crystal panel 2. The data driver 18 determines the reference voltages for the data signals according to the data control signals and outputs the determined reference voltages to the liquid crystal panel 2 to adjust a rotation angle of liquid crystal molecules.

The gate driver 20 controls ON/OFF operation of the thin film transistors (TFTs) in the liquid crystal panel 2 according to the gate control signals from the timing controller 12. Accordingly, the data signals from the data driver 18 are supplied to pixels in the pixel regions of the liquid crystal panel 2 through the TFTs. The source voltage generator 14 supplies source voltages to elements of the LCD device and a common voltage to the liquid crystal panel 2.

LCD devices have been developed to have multiple functions in addition to display of images. Specifically, an LCD device including an image sensor array has been suggested. The LCD device including an image sensor array can function as a scanner, thereby sensing images as well as displaying images. When the LCD device including an image sensor array is operated as a scanner in a scan mode, a photo voltage generated based on intensity of received light is stored in a storage capacitor for photo voltage. The photo voltage in the storage capacitor is outputted to an external circuit in response to a scan signal. In the external circuit, the photo voltage is compared with a sensing reference voltage so that a scanned image is read. While the scan signal is applied, the photo voltage is transmitted from the storage capacitor to the external circuit, and thereafter a reset voltage having the same voltage as the sensing reference voltage is transmitted from the external circuit to the storage capacitor. Accordingly, the storage capacitor is charged up to a voltage level of the sensing reference voltage at that time.

FIG. 3 is a schematic timing chart showing such scan signals for operation after conversion to a scan mode of a liquid crystal display device according to the related art. FIG. 3 exemplarily shows two scan signals "$V_{GN}$" and "$V_{GN+1}$" sequentially applied to an $n^{th}$ gate line "Gn" and an $(n+1)^{th}$ gate line "Gn+1." As shown in FIG. 3, a time period for a single frame of each scan signal "$V_{GN}$" and "$V_{GN+1}$" is divided into three sub time periods "tp1," "tp2" and "tp3." Each scan signal "$V_{GN}$" and "$V_{GN+1}$" has a high level voltage of +25V during the first and second sub time periods "tp1" and "tp2," and has a low level voltage of −5V during the third sub time period "tp3." A photo voltage stored in a storage capacitor is transmitted to an external circuit (not shown) during the first sub time period "tp1," and then a reset voltage is transmitted from the external circuit to the storage capacitor during the second sub time period "tp2." In addition, a photo voltage is stored in the storage capacitor during the third sub time period "tp3."

However, when the LCD device is operated using the scan signals "$V_{GN}$" and "$V_{GN+1}$" of FIG. 3, a scanned image can be distorted. According to the operation using the scan signals "$V_{GN}$" and "$V_{GN+1}$" of FIG. 3, the photo voltage stored in the storage capacitor is transmitted to the external circuit immediately after a display mode of the LCD device is converted into a scan mode in the first frame. While the LCD device is operated in the display mode, a parasitic voltage can be generated due to a parasitic capacitor formed by elements such as TFTs and signal lines of the LCD device, and be stored in the storage capacitor. Accordingly, the parasitic voltage can be added to the photo voltage in the storage capacitor at the start of the first frame to distort the scanned image in the scan mode. Even though the storage capacitor is reset with the reset voltage during the second sub time period "tp2" of the first frame, the storage capacitor is not completely charged up to the reset voltage because of shortage of the second sub time period "tp2."

SUMMARY OF THE INVENTION

The invention pertains to a liquid crystal device and a method of driving the same, which substantially obviate one or more of problems due to limitations and disadvantages of the related art.

An object of the invention is to provide a liquid crystal device for displaying and sensing images and a method of driving the same where an image is accurately scanned.

Additional features and advantages of the invention will be set forth in the description which follows, and in part will be apparent from the description, or may be learned by practice of the invention. The objectives and other advantages of the invention will be realized and attained by the structures and/or processes particularly pointed out in the written description and claims hereof as well as the appended drawings.

The invention, in part, provides a liquid crystal device for displaying and sensing images including: a sensing part generating a photo voltage corresponding to an incident light and storing the photo voltage, the sensing part transmitting the photo voltage to a processor according to a scan signal; and a display part displaying images corresponding to a data signal according to the scan signal.

The invention, in part, provides a driving method of a liquid crystal device in one of a display mode and a scan mode including: converting the display mode into the scan mode; simultaneously applying a high level voltage to a plurality of gate lines during a first time period after the display mode is converted into the scan mode; applying a reset voltage to a first thin film transistor connected to each gate line while the high level voltage is applied to the plurality of gate lines.

The invention, in part, provides a liquid crystal device operated in a display mode and a scan mode including: first and second gate lines; a data line crossing the first and second gate lines; a first thin film transistor connected to the second gate line and the data line; a liquid crystal capacitor and a first storage capacitor connected to the first thin film transistor, the liquid crystal capacitor displaying an image corresponding to a data signal of the data line; a bias line connected to the liquid crystal capacitor and the first storage capacitor; a second thin film transistor connected to the bias line, the second thin film transistor generating a photo voltage corresponding to an incident light; a second storage capacitor connected to the second thin film transistor, the second storage capacitor receiving and storing the photo voltage; a third thin film transistor connected to the second storage capacitor and the first gate line; and a processor connected to the third thin film transistor, the processor supplying a reset voltage to the second storage capacitor during a first frame after the display mode is converted into the scan mode.

The invention, in part, provides a method of driving a liquid crystal device alternately in a display mode and a scan mode including: displaying images through a liquid crystal capacitor in the display mode; converting the display mode into the scan mode; simultaneously turning on a plurality of first thin film transistors during a first time period after the display mode is converted into the scan mode; charging up a storage capacitor connected to the first thin film transistor with a reset voltage; and sequentially turning on the plurality of first thin film transistor after the first time period.

According to an aspect of the present invention, there is provided a liquid crystal device for displaying and sensing images, the device comprising: a sensing part to sense an image in a scan mode of the liquid crystal device, the sensing part including at least one charging element which is charged at a start of the scan mode with a reset voltage, so as to reset the at least one charging element for the scan mode; and a display part to display an image corresponding to a data signal according to a scan signal in a display mode of the liquid crystal device.

According to another aspect of the present invention, there is provided a driving method of a liquid crystal device in one of a display mode and a scan mode, the method comprising: simultaneously applying a high level voltage to a plurality of gate lines during a first time period of the scan mode; and applying a reset voltage to a first thin film transistor connected to each of the gate lines while the high level voltage is applied to each of the plurality of gate lines.

According to another aspect of the present invention, there is provided a method of driving a liquid crystal device capable of selectively operating in one of a display mode and a scan mode, the method comprising: displaying images through a liquid crystal capacitor in the display mode; switching the liquid crystal device to be in the scan mode from the display mode; and simultaneously turning on a plurality of first thin film transistors during a first time period after the liquid crystal device is switched into the scan mode; charging up at least one storage capacitor each connected to the respective first thin film transistor with a reset voltage.

According to another aspect of the present invention, there is provided a method for controlling a liquid crystal device capable of selectively operating in one of a plurality of modes including a scan mode and a display mode, the liquid crystal device including a sensing part to sense images in the scan mode and a display part to display images in the display mode, the method comprising: when the liquid crystal device enters the scan mode, charging at least one charging element of the sensing part at a start of the scan mode with a reset voltage, so as to reset the at least one charging element for the scan mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the invention, which are illustrated in the accompanying drawings. Wherever possible, similar reference numbers will be used throughout the drawings to refer to the same or like parts.

Figure 4A:
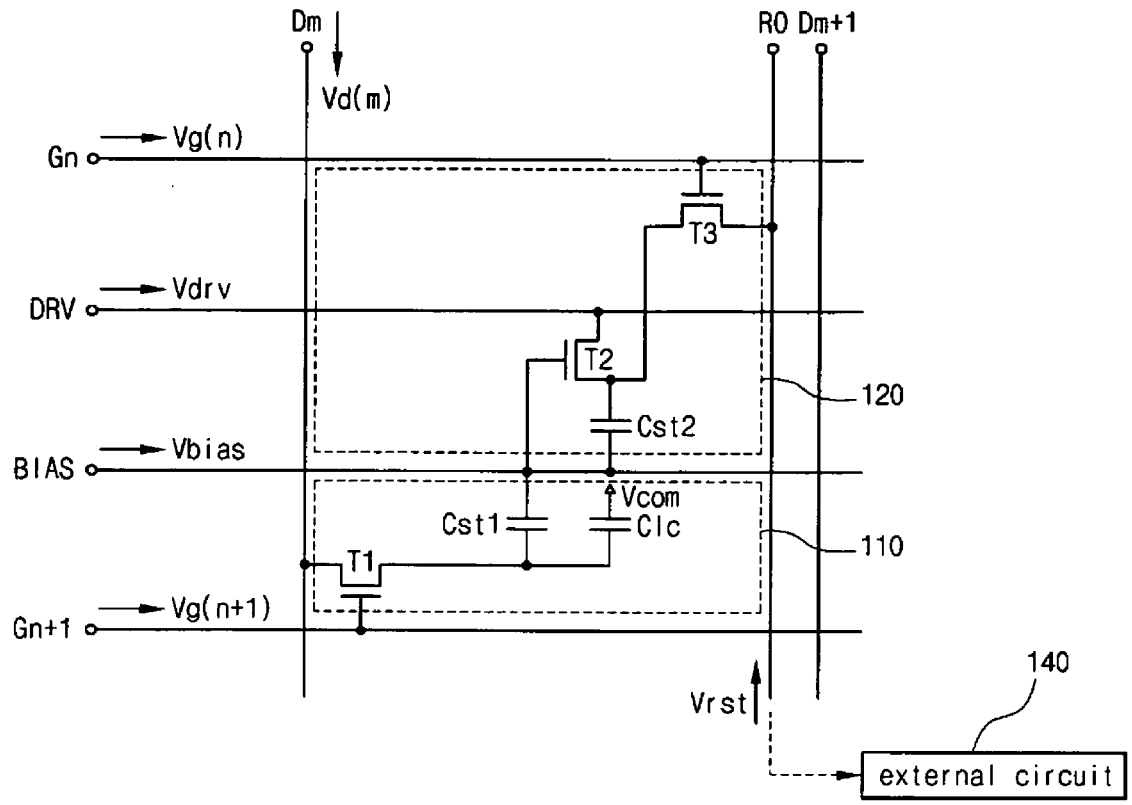
FIG. 4A is a schematic equivalent circuit diagram showing a pixel structure of a liquid crystal (LC) device according to an embodiment of the present invention.
Figure 4B:
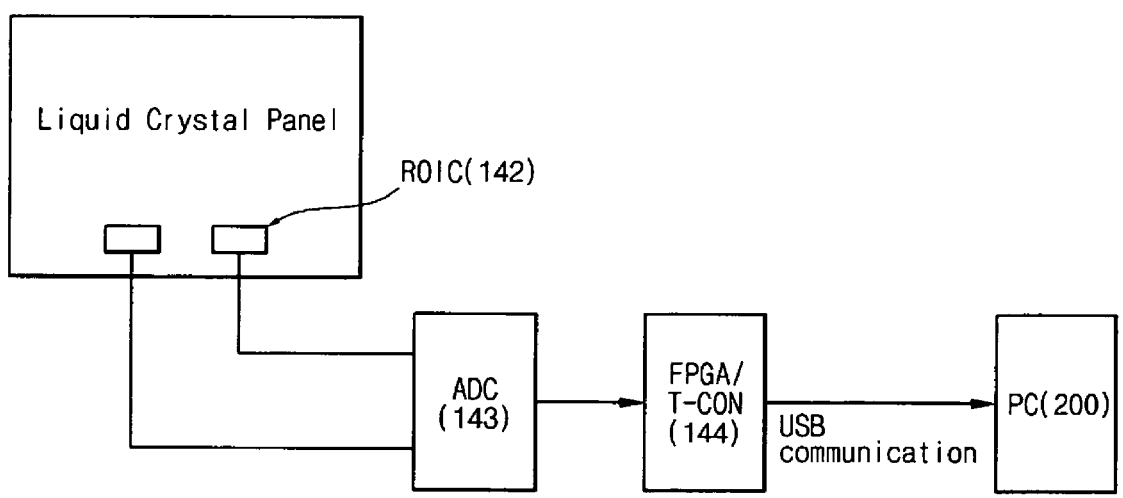
FIG. 4B is a block diagram showing an example of an external circuit 140 of FIG. 4A according to an embodiment of the present invention.

FIG. 4A is a schematic equivalent circuit diagram showing a pixel structure of a liquid crystal (LC) device, and FIG. 4B is a block diagram showing an example of an external circuit 140 of FIG. 4A, all according to an embodiment of the present invention. Although one pixel of the LC device is shown, the LC device includes a plurality of such pixels in a matrix or other configuration at its display/sensing liquid crystal panel.

The LC device of the present invention displays images in a display mode and senses images in a scan mode. The mode of the LC device can be converted (or switched) from the display mode to the scan mode by a driving circuit, and vice versa. As shown in FIG. 4A, a pixel of the LC device is defined by a crossing of gate lines Gn and Gn+1 and data lines Dm and Dm+1, and the LC device includes a plurality of such pixels in its display/sensing panel. Each pixel in the panel includes a display part 110 and a sensing part 120, all operatively coupled. Images are displayed by the display part 110, and incident light is sensed by the sensing part 120.

Figure 1:
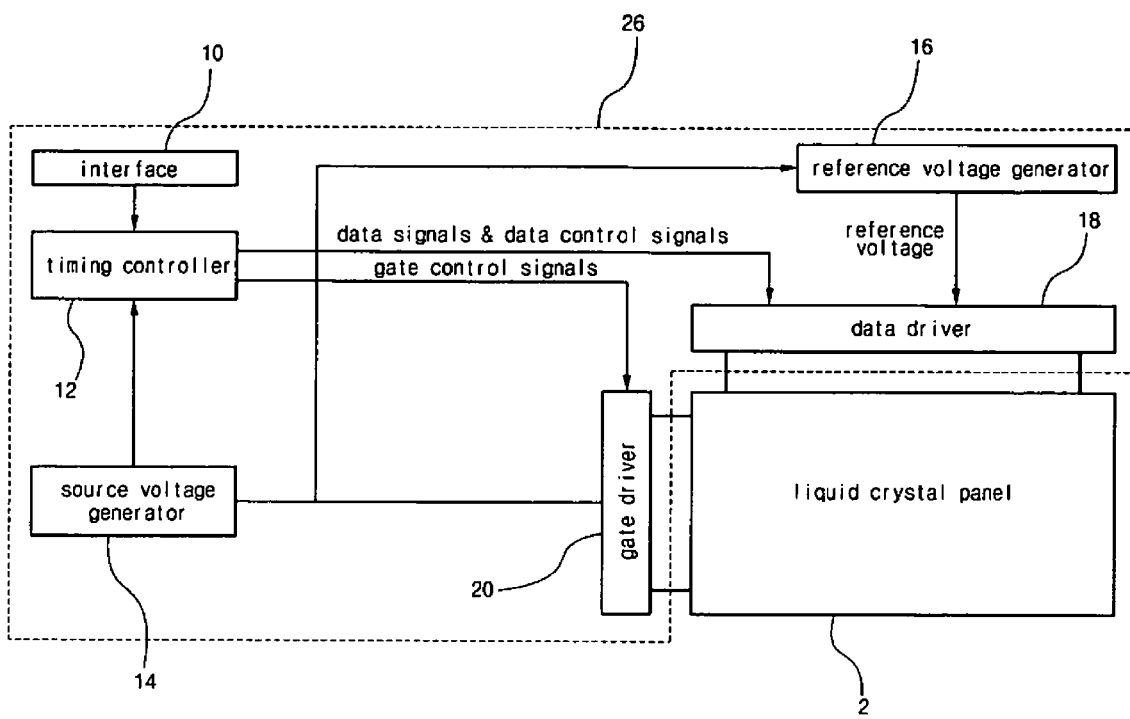
FIG. 1 is a schematic block diagram of a liquid crystal display device according to the related art.
Figure 2:
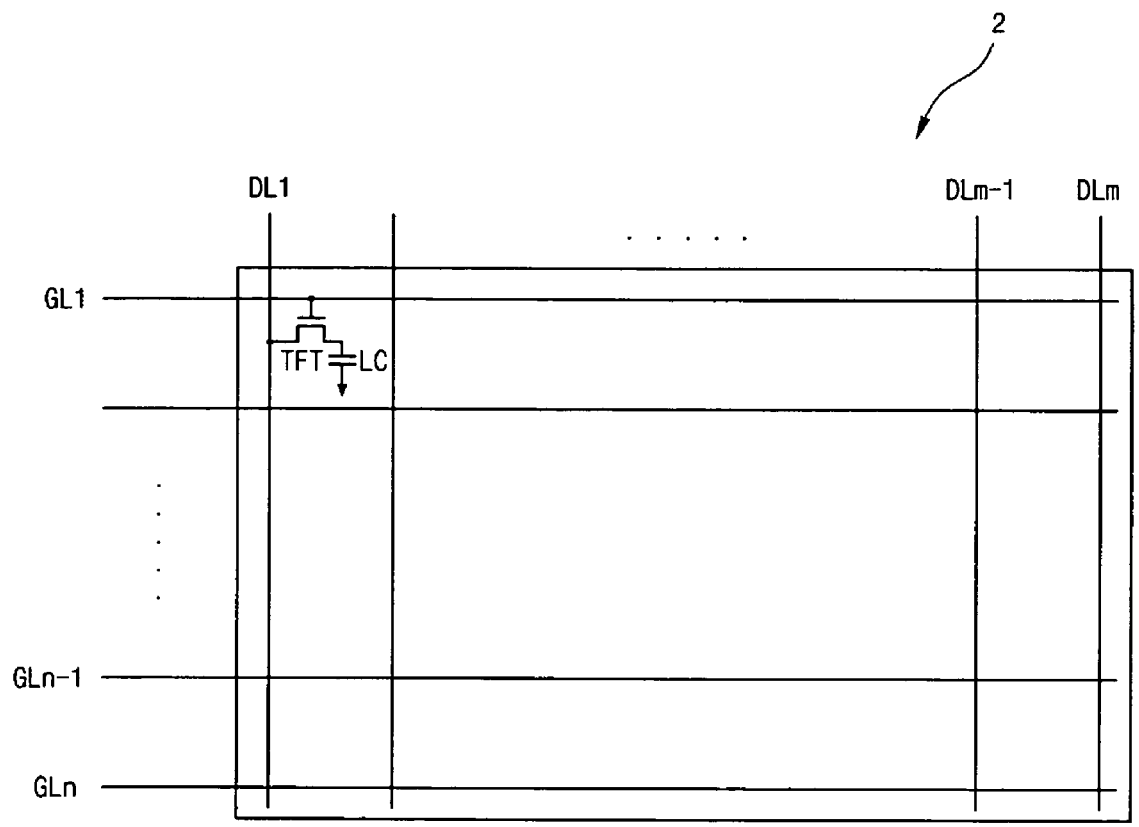
FIG. 2 is a schematic view showing a liquid crystal panel of the liquid crystal display device according to the related art.
Figure 3:
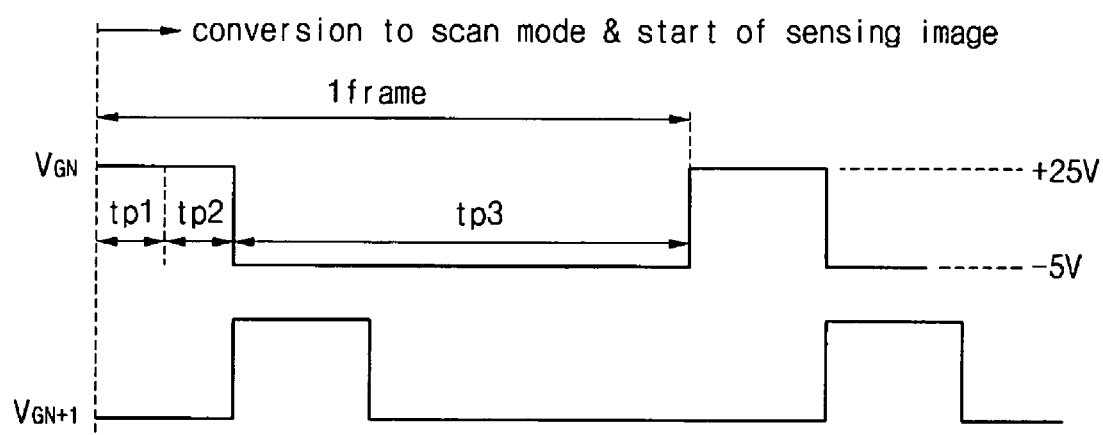
FIG. 3 is a schematic timing chart showing scan signals for operation after conversion to a scan mode of a liquid crystal display device according to the related art.

The display part 110 may have a pixel structure of a liquid crystal display device. For instance, the display part 110 may include a first thin film transistor (TFT) "T1," a first storage capacitor "Cst1" and a liquid crystal capacitor "Clc." The first TFT "T1" is turned on/off by an $(n+1)^{th}$ scan signal "Vg(n+1)" through an $(n+1)^{th}$ gate line "Gn+1." During the first TFT "T1" is turned on, an $m^{th}$ data signal "Vd(m)" of an $m^{th}$ data line "Dm" is transmitted to the first storage capacitor "Cst1" and the liquid crystal capacitor "Clc" through the first TFT "T1." The first storage capacitor "Cst1" stores the $m^{th}$ data signal "Vd(m)," and the liquid crystal capacitor "Clc" displays an image corresponding to the $m^{th}$ data signal "Vd(m)" using a liquid crystal layer of the LC device. The LC device includes known LC device components for selectively displaying and sensing images. For instance, the LC device can include the LCM driving circuit of FIG. 1 and a known image sensor array for scanning images in the scan mode.

The sensing part 120 includes a second TFT "T2," a second storage capacitor "Cst2" and a third TFT "T3." The second TFT "T2" is a photo TFT for outputting a photo current corresponding to an intensity of light incident on the second TFT "T2". The photo current outputted from the second TFT "T2" is then sent to the second storage capacitor "Cst2" and stored therein as a photo voltage. Accordingly, the second TFT "T2" functions as an image sensing element outputting a photo current in proportion to intensity of incident light. A bias voltage "Vbias" of a bias line "BIAS" is applied to a gate electrode of the second TFT "T2," and a driving voltage "Vdrv" of a driving line "DRV" is applied to a source electrode of the second TFT "T2." The bias voltage "Vbias" and the driving voltage "Vdrv" are a direct current (DC) voltages. The photo current/voltage may be outputted while the second TFT "T2" is turned off. Accordingly, the bias voltage "Vbias" may have one of 0V and a negative (−) voltage if the second TFT "T2" is of a negative (n) type, while the bias voltage "Vbias" may have one of 0V and a positive voltage (+) if the second TFT "T2" is of a positive (p) type. In addition, the driving voltage "Vdrv" functions as a voltage source for the photo current. For example, the driving voltage of about 10V is continuously applied to the second TFT "T2" so that the second TFT "T2" can output the photo current corresponding to the incident light to the second storage capacitor "Cst2." Accordingly, the driving voltage "Vdrv" is used as a voltage source for supplying the photo current to the second storage capacitor "Cst2."

The third TFT "T3" controls a transmission of the photo voltage in the second storage capacitor "Cst2" to an external circuit (or processor) 140 through a read-outline "RO." An $n^{th}$ scan signal "Vg(n)" of an $n^{th}$ gate line "Gn" is applied to a gate electrode of the third TFT "T3," and the photo voltage in the second storage capacitor "Cst2" is then transmitted to the external circuit 140 through the third TFT "T3". Even though not shown in FIG. 4A, the $n^{th}$ gate line is connected to a gate electrode of a first TFT in an adjacent pixel so that the first TFT in the adjacent pixel is turned on/off by the $n^{th}$ scan signal "Vg(n)."

The external circuit 140 receives the photo voltage in the second storage capacitor "Cst2" through the read-out line "RO." The external circuit 140 compares the received photo voltage with a sensing reference voltage, thereby reading a scanned image. In addition, the external circuit 140 may include an algorithm that allows an image corresponding to a difference between the photo voltage and the sensing reference voltage to be displayed in the display part 110 or in another display device. For example, as shown in FIG. 4B, the external circuit 140 may include a read-out integrated circuit (ROIC) 142, an analog-to-digital converter (ADC) 143, and a field programmable gate array (FPGA) 144. The ROIC 142 is connected to the RO line, reads the photo voltage in the second storage capacitor "Cst2" through the RO line, and then amplifies and outputs an amplified photo voltage in analog form. The ADC 143 then converts this photo voltage from the analog form to a digital form. The FPGA 144 controls the ROIC 142 and transmits the digital photo voltage to a display means such as a personal computer (PC) 200, the display area of the liquid crystal panel, etc. The FPGA 144 may be integrated into a timing controller (e.g., 12 in FIG. 1 or T-Con) of the liquid crystal device of the present invention, whereby the timing controller controls the gate driver, the data driver and the ROIC 142 of the liquid crystal device. When a difference between the photo voltage and the sensing reference voltage is 0, the external circuit 140 may interpret a scanned image as black. The external circuit 140 is located generally external to the display area of the panel.

Even though the first, second and third TFTs "T1," "T2" and "T3" are of a negative (N) type (i.e., negative type TFTs) in this example, the first, second and third TFTs "T1," "T2" and "T3" may be of a positive (P) type in another example.

Figure 5:
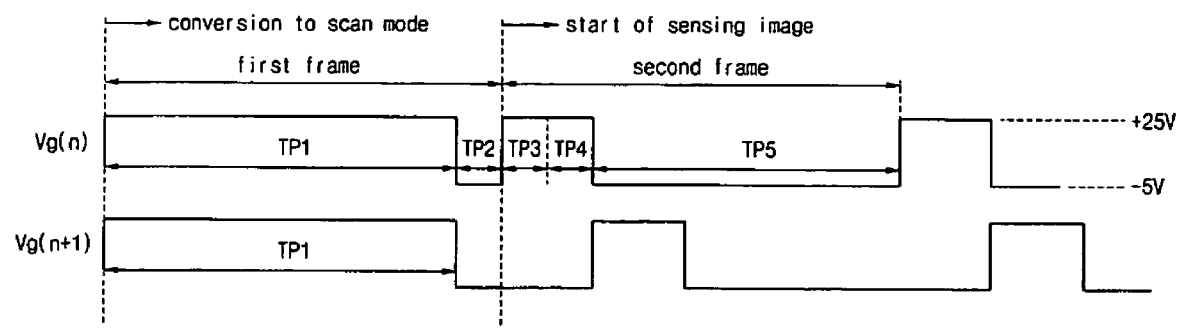
FIG. 5 is a schematic timing chart showing scan signals for operation after conversion to a scan mode of a liquid crystal device according to an embodiment of the present invention.

FIG. 5 is a schematic timing chart showing examples of scan signals for operation after conversion to a scan mode of the liquid crystal device according to an embodiment of the present invention. These scan signals are applied to the liquid crystal device of FIG. 4A, but can be applied to other types of liquid crystal devices capable of both image displaying and image sensing.

FIG. 5 exemplarily shows two scan signals "Vg(n)" and "Vg(n+1)" sequentially applied to the $n^{th}$ gate line "Gn" and $(n+1)^{th}$ gate line "Gn+1." In addition, since the TFTs T1-T3 are of N type in the example of FIG. 4A, the scan signals "Vg(n)" and "Vg(n+1)" may have a high level voltage of, e.g., about +25V for turning on the TFTs and may have a low level voltage of, e.g., about −5V for turning off the TFTs. If the TFTs are of positive type, the voltages may be varied as needed. Each scan signal "Vg(n)" and "Vg(n+1)" includes a first frame that starts immediately after a display mode (or other mode) of the liquid crystal device is switched to a scan mode. A second frame then follows the first frame.

The first frame may be divided into first and second time periods "TP1" and "TP2", and the second frame may be divided into third, fourth and fifth time periods "TP3," "TP4" and "TP5." In the first frame, the scan signals "Vg(n)" and "Vg(n+1)" have the same shape and the same timing as each other. In the second frame, the scan signals "Vg(n)" and "Vg(n+1)" are sequentially applied to the respective gate lines for sensing an image or other entity.

As mentioned, the liquid crystal device of the present invention may be selectively operated between a display mode and a scan mode. As shown in FIGS. 4A and 5, a photo current is generated by the second TFT "T2" of the sensing part 120 in each pixel, the generated photo current is stored in the corresponding second storage capacitor "Cst2" during the scan mode as a photo voltage. For each pixel, the stored photo voltage in the second storage capacitor "Cst2" is transmitted to the external circuit 140 by sequentially applying scan signals to the third TFT "T3" through the gate lines "Gn" and "Gn+1". Before the photo voltage in the second storage capacitor "Cst2" is transmitted to the external circuit 140, a high level voltage is applied to each third TFT "T3" through the gate lines "Gn" and "Gn+1" to turn on each third TFT "T3," and a reset voltage "Vrst" is applied to the second storage capacitor "Cst2" by the external circuit 140 during the first time period "TP1" of the first frame. For example, the reset voltage "Vrst" may have the same voltage as the sensing reference voltage corresponding to a black image. The reset voltage "Vrst" can be at or around 2.5V as an example.

Accordingly, during the first time period "TP1" of the first frame following directly after the conversion to a scan mode, the reset voltage "Vrst" is transmitted from the external circuit 140 to the third TFT "T3" turned on by the high level scan signal, through the read-out line "RO," and each second storage capacitor "Cst2" in the sensing part 120 is thereby completely charged up with the reset voltage "Vrst." Even though a parasitic voltage due to a parasitic capacitor in elements such as the first, second and third TFTs "T1," "T2" and "T3," the bias line "BIAS" and the driving line "DRV" may be added to a photo voltage in the second storage capacitor "Cst2" during a display mode of the liquid crystal device, distortion of the scanned image in a scan mode is prevented or eliminated because the reset voltage "Vrst" corresponding to the sensing reference voltage completely charges up each second storage capacitor "Cst2" just before the start of image sensing in the scan mode.

In the first frame directly following the conversion to a scan mode, each scan signal has a high level voltage during the first time period "TP1" and a low level voltage during the second time period "TP2." Accordingly, each second storage capacitor "Cst2" is charged up with the reset voltage "Vrst" corresponding to the sensing reference voltage of the external circuit 140 during the first time period "TP1." In one example, the duration of the first time period "TP1" may range within one to two seconds. Even though the reset voltage is applied for one frame time in this example, the reset voltage may be applied for over one frame time in another example. The second time period "TP2" corresponds to a delay time due to operational characteristics of the external circuit 140 that is formed as an integrated circuit (IC) chip. Thus, the second time period "TP2" may be omitted in another example. In addition, the high level voltage of the scan signal for charging up the second storage capacitor "Cst2" with the reset voltage "Vrst" is simultaneously applied to all gate lines in this example. However, in another example, the high level voltage of the scan signal may be sequentially applied to a plurality of groups of gate lines, each group having at least two gate lines.

In the second frame, the scan signals "Vg(n)" and "Vg(n+1)" are sequentially applied to the gate lines "Gn" and "Gn+1," respectively. Each scan signal has a high level voltage, for example, +25V during the third and fourth time periods "TP3" and "TP4," and has a low level voltage, for example, −5V during the fifth time period "TP5." Accordingly, the third transistor "T3" is turned on during the third and fourth time periods "TP3" and "TP4." The photo voltage stored in the second storage capacitor "Cst2" of the sensing part 120 is transmitted to the external circuit 140 through the read-out line (RO) during the third time period "TP3." The reset voltage "Vrst" is transmitted from the external circuit 140 to the second storage capacitor "Cst2" for resetting during the fourth time period "TP4." A new photo current is generated in the second TFT "T2" of the sensing part 120 due to image sensing and is stored in the second storage capacitor "Cst2" as a new photo voltage during the fifth time period "TP5."

Each time the liquid crystal device switches its mode from a display mode (or other mode) to a scan mode, the first frame and its corresponding operation and scan signals of FIG. 5 can be used and provided in the liquid crystal device, so as to charge/reset the second storage capacitors "Cst2" and thereby eliminate any parasitic or other charges stored therein from the display mode.

Consequently, in the liquid crystal device for displaying and sensing images and the method of driving the same according to the present invention, images are accurately sensed even when the liquid crystal device switches from a display mode to a scan mode.

While the invention has been particularly shown and described with reference to illustrated embodiment(s) thereof, it will be understood by those skilled in the art that the foregoing and other changes in form and details may be made therein without departing from the spirit and scope of the invention.

What is claimed is:

1. A liquid crystal device for displaying and sensing images, the device comprising:
    a sensing part to sense an image in a scan mode of the liquid crystal device, the sensing part including at least one charging element which is charged at a start of the scan mode with a reset voltage, so as to reset the at least one charging element for the scan mode; and
    a display part to display an image corresponding to a data signal according to a scan signal in a display mode of the liquid crystal device,
    wherein the at least one charging element is connected to a storage capacitor of the display part in series,
    wherein the sensing part and the display part are separated, and
    wherein the at least one charging element receives a photo current generated by a thin film transistor corresponding to an incident light.

2. The device of claim 1, wherein the at least one charging element involves a plurality of capacitors that are simultaneously charged with the reset voltage at the start of the scan mode.

3. The device of claim 2, wherein each of the plurality of capacitors is located in a different pixel region.

4. The device of claim 1, wherein after the at least one charging element is reset with the reset voltage at the start of the scan mode, the at least one charging element is charged with a photo voltage obtained from scanning the image.

5. The device of claim 4, further comprising:
    a processor to supply the reset voltage to the at least one charging element at the start of the scan mode, and to receive the charged photo voltage from the at least one charging element.

6. The device of claim 5, wherein the processor compares the received charged photo voltage with a reference voltage and generates sensing signals according to the comparison result.

7. The device of claim 6, wherein the display part receives and processes the sensing signals and displays an image according to the processed sensing signals.

8. The device of claim 1, wherein the display part comprises:
a first thin film transistor to be turned on/off according to the scan signal;
the storage capacitor to store the data signal; and
a liquid crystal capacitor to receive the data signal through the first thin film transistor.

9. The device of claim 1, wherein the sensing part further comprises:
a sensor to generate a photo current corresponding to an incident light, wherein the at least one charging element receives the generated photo current and stores the photo current as a photo voltage; and
a switching element to selectively output the stored photo voltage according to the scan signal.

10. A liquid crystal device for displaying and sensing images, the device comprising:
a sensing part to sense an image in a scan mode of the liquid crystal device, the sensing part including at least one charging element which is charged at a start of the scan mode with a reset voltage, so as to reset the at least one charging element for the scan mode; and
a display part to display an image corresponding to a data signal according to a scan signal in a display mode of the liquid crystal device,
wherein the sensing part includes:
a first thin film transistor to generate a photo current corresponding to an incident light, wherein the at least one charging element receives the photo current and stores the photo current as a photo voltage; and
a second thin film transistor to be turned on/off according to the scan signal, the third thin film transistor transmitting the photo voltage stored in the at least one charging element to a processor.

11. A driving method of a liquid crystal device in one of a display mode and a scan mode, the method comprising:
simultaneously applying a high level voltage to a plurality of gate lines during a first time period of the scan mode; and
applying a reset voltage to a first thin film transistor connected to each of the gate lines while the high level voltage is applied to each of the plurality of gate lines,
wherein the first thin film transistor is connected to a storage capacitor, and
wherein the storage capacitor receives a photo current generated by a second thin film transistor corresponding to an incident light.

12. The method of claim 11, further comprising:
sequentially applying a scan signal to the plurality of gate lines after a frame having the first time period.

13. The method of claim 11, wherein the first time period is 1 to 2 seconds.

14. The method of claim 11, further comprising:
applying a low level voltage to the plurality of gate lines during a second time period of the scan mode after the first time period.

15. The method of claim 14, wherein the first time period is shorter than a single frame of the scan mode.

16. The method of claim 14, further comprising:
charging up the storage capacitor connected to the first thin film transistor with the reset voltage.

17. A driving method of a liquid crystal device in one of a display mode and a scan mode, the method comprising:
simultaneously applying a high level voltage to a plurality of gate lines during a first time period of the scan mode;
applying a reset voltage to a first thin film transistor connected to each of the gate lines while the high level voltage is applied to each of the plurality of gate lines;
applying a low level voltage to the plurality of gate lines during a second time period of the scan mode after the first time period;
charging up a storage capacitor connected to the first thin film transistor with the reset voltage;
transmitting a first photo voltage in the storage capacitor to a processor during a third time period of the scan mode; and
applying the reset voltage of the processor to the first thin film transistor during a fourth time period of the scan mode after the third time period while the scan signal is applied to each gate line.

18. The method of claim 17, further comprising:
storing a second photo voltage in the storage capacitor during a fifth time period of the scan mode after the fourth time period.

19. A liquid crystal device capable of operating in one of a display mode and a scan mode, comprising:
first and second gate lines;
a data line crossing the first and second gate lines;
a first thin film transistor coupled to the second gate line and the data line;
a liquid crystal capacitor and a first storage capacitor coupled to the first thin film transistor, the liquid crystal capacitor displaying an image corresponding to a data signal of the data line;
a bias line coupled to the liquid crystal capacitor and the first storage capacitor;
a second thin film transistor coupled to the bias line, the second thin film transistor generating a photo voltage corresponding to an incident light;
a second storage capacitor coupled to the second thin film transistor, the second storage capacitor receiving and storing the photo voltage;
a third thin film transistor coupled to the second storage capacitor and the first gate line; and
a processor coupled to the third thin film transistor, the processor supplying a reset voltage to the second storage capacitor during a first time period of a first frame after the liquid crystal device enters the scan mode.

20. The device of claim 19, wherein the first time period is 1 to 2 seconds.

21. The device of claim 19, further comprising:
a driving line coupled to the second thin film transistor; and
a read-out line connecting the third thin film transistor to the processor.

22. The device of claim 19, wherein the first and second gate lines simultaneously supply a high level scan signal respectively to the third and first thin film transistors during the first time period of the first frame after the liquid crystal device enters the scan mode.

23. A method of driving a liquid crystal device capable of selectively operating in one of a display mode and a scan mode, the method comprising:
displaying images through a liquid crystal capacitor in the display mode;
switching the liquid crystal device to be in the scan mode from the display mode;
simultaneously turning on a plurality of first thin film transistors, which are connected to a plurality of gate lines, respectively, during a first time period after the liquid crystal device is switched into the scan mode; and charging up at least one storage capacitor each connected to the respective first thin film transistor with a reset voltage, wherein the at least one storage capacitor receives a photo current generated by a second thin film transistor.

24. The method of claim 23, further comprising:

sequentially applying a scan signal to the plurality of gate lines after a frame having the first time period.

25. The method of claim 23, wherein the reset voltage corresponds to a black image of the liquid crystal device.

26. A method of driving a liquid crystal device capable of selectively operating in one of a display mode and a scan mode, the method comprising:

displaying images through a liquid crystal capacitor in the display mode;

switching the liquid crystal device to be in the scan mode from the display mode;

simultaneously turning on a plurality of first thin film transistors, which are connected to a plurality of gate lines, respectively, during a first time period after the liquid crystal device is switched into the scan mode;

charging up at least one storage capacitor each connected to the respective first thin film transistor with a reset voltage;

generating a photo current in a second thin film transistor coupled to one of the first thin film transistors, the photo current corresponding to an intensity of an incident light upon the second thin film transistor; and storing the photo current in the storage capacitor as a photo voltage.

27. The method of claim 26, further comprising:

reading the photo voltage in the respective storage capacitor during a second time period of the scan mode after the first time period.

28. A method for controlling a liquid crystal device capable of selectively operating in one of a plurality of modes including a scan mode and a display mode, the liquid crystal device including pixels, each of which includes a sensing part to sense images in the scan mode and a display part to display images in the display mode, the method comprising:

when the liquid crystal device enters the scan mode, simultaneously charging elements of the sensing parts of the pixels at a start of the scan mode with a reset voltage, so as to reset the charging elements for the scan mode, wherein each of the charging elements receives a photo current generated by a thin film transistor corresponding to an incident light.

29. The method of claim 28, wherein each of the charging elements subsequently outputs a photo voltage obtained from scanning an image in the scan mode.

* * * * *